United States Patent
Sahar

(10) Patent No.: US 10,154,110 B2
(45) Date of Patent: Dec. 11, 2018

(54) SYSTEM AND METHODS THEREOF FOR DELIVERY OF POPULAR CONTENT USING A MULTIMEDIA BROADCAST MULTICAST SERVICE

(71) Applicant: Qwilt, Inc., Redwood City, CA (US)

(72) Inventor: Dan Sahar, San Francisco, CA (US)

(73) Assignee: Qwilt, Inc., Redwood City, CA (US)

( * ) Notice: Subject to any disclaimer, the term of this patent is extended or adjusted under 35 U.S.C. 154(b) by 188 days.

(21) Appl. No.: 14/689,630

(22) Filed: Apr. 17, 2015

(65) Prior Publication Data

US 2015/0304445 A1    Oct. 22, 2015

Related U.S. Application Data

(60) Provisional application No. 61/982,723, filed on Apr. 22, 2014.

(51) Int. Cl.
| | |
|---|---|
| *G06F 15/177* | (2006.01) |
| *H04L 29/08* | (2006.01) |
| *H04L 29/06* | (2006.01) |
| *H04W 4/06* | (2009.01) |

(52) U.S. Cl.
CPC .......... *H04L 67/2842* (2013.01); *H04L 65/60* (2013.01); *H04W 4/06* (2013.01)

(58) Field of Classification Search
CPC . H04L 67/2842; H04L 65/60; H04N 21/2183; H04N 21/2306

USPC .......................................... 709/213, 219, 239
See application file for complete search history.

(56) References Cited

U.S. PATENT DOCUMENTS

| | | | |
|---|---|---|---|
| 6,917,960 B1 * | 7/2005 | Decasper | G06F 17/30902 707/999.01 |
| 7,818,402 B1 * | 10/2010 | Zhang | H04L 61/1582 709/219 |
| 8,451,764 B2 * | 5/2013 | Chao | H04W 76/002 370/312 |
| 8,681,680 B2 * | 3/2014 | Mao | H04N 7/17318 370/312 |
| 9,167,049 B2 * | 10/2015 | Fliam | H04L 67/2885 |
| 2012/0117201 A1 * | 5/2012 | Arolovitch | G06F 17/30902 709/219 |

* cited by examiner

*Primary Examiner* — David R Lazaro
*Assistant Examiner* — Mariegeorges A Henry
(74) *Attorney, Agent, or Firm* — M&B IP Analysts, LLC.

(57) ABSTRACT

Multimedia content, live as well as on-demand, is typically delivered over a network responsive to a request by a user device from a content source and is provided point-to-point. Certain multimedia cache systems are designed to identify popular content and provide such content from locations that are in proximity to the user device, thereby reducing load on the overall network. The system and methods identify user devices capable of receiving content using a multimedia broadcast multicast service (MBMS) and evolved MBMS (eMBMS) delivering popular content by redirecting the content delivery from content caches or the content source to a MBMS/eMBMS thereby reducing overall load of a network.

18 Claims, 4 Drawing Sheets

SYSTEM AND METHODS THEREOF FOR DELIVERY OF POPULAR CONTENT USING A MULTIMEDIA BROADCAST MULTICAST SERVICE

CROSS-REFERENCE TO RELATED APPLICATION

This patent application claims benefit of and priority to U.S. provisional patent application 61/982,723, filed Apr. 22, 2014, entitled "A System and Method Thereof for Delivery of Popular Content Using a Multimedia Broadcast Multicast Service", which is hereby incorporated by reference in its entirety. This patent application is related to co-pending U.S. patent application Ser. No. 13/006,875 entitled "Methods for Detection of Content Servers and Caching Popular Content Therein" and Ser. No. 13/006,785 entitled "System for Detection of Content Servers and Caching Popular Content Therein", both assigned to common assignee and are incorporated herein by reference in their entirety.

BACKGROUND

1. Technical Field

The present disclosure generally relates to multimedia broadcast multicast service (MBMS) and/or evolved MBMS (eMBMS) and more specifically to delivery of content identified to be popular using MBMS/eMBMS systems.

2. Description of the Related Art

Consumption of multimedia content, primarily video content, from online content sources to multiple types of user devices has become a common occurrence. The delivery of media content has been increasing significantly and taking an increasing portion of the total bandwidth available for data transmission over data networks. To overcome some of this overload, multimedia content caching systems are used, for example, the types that are described in the co-pending U.S. patent application Ser. No. 13/006,875 entitled "Methods for Detection of Content Servers and Caching Popular Content Therein" and Ser. No. 13/006,785 entitled "System for Detection of Content Servers and Caching Popular Content Therein", both assigned to common assignee.

Such systems identify popular content and store it in their internal caches. When a request is sent for the content to be served from the original content provider, the device requesting the content is instructed to redirect its request to the content caching system, thereby reducing the load on the content provider as well as the network segment between the content provider and the content caching system delivering the content thereafter. Normally, content delivered by either the content provider or the content caching system, is delivered point-to-point for each requesting consumer.

Over the past several years, the usage of mobile user devices has also increased in popularity, with devices using wireless connectivity such as WiFi as well as various cellular technologies. These technologies allow the consumption of data over the air by such user devices. The proliferation of mobile devices coupled with an appetite for multimedia content has brought forth the creation of a standard known as Multimedia Broadcast Multicast Service (MBMS) developed for cellular networks, including the evolved Multimedia Broadcast Multicast Service (eMBMS) standard for long-term evolution (LTE) telecommunication networks, all referred to herein as MBMS. Basically, this solution enables point-to-multipoint data transmission thereby providing the efficient delivery of broadcast and multicast services to mobile devices. Such mobile devices may include smartphones, tablet computers, and the like. Using MBMS it is possible to provide multimedia content in a single transmission to multiple devices thereby reducing bandwidth requirements.

SUMMARY

It would be advantageous to provide a solution that combines the abilities of content caching systems and MBMS to alleviate the bandwidth limitations when popular content is requested by a large number of user devices.

The foregoing and/or exemplary embodiments may be achieved by a content caching system including an interface to a network, the network delivering content from one or more content sources to one or more user devices; a cache memory communicatively connected to the interface; and a processing unit, communicatively connected to the network, configured to: identify popular content sent over the network; store the identified popular content in the cache memory; deliver at least a portion of the identified popular content to a gateway coupled to the network, the gateway configured to provide a multicast service respective of the content; intercept a request to deliver popular content stored in the cache memory; and redirect the request from a user device to deliver the popular content stored in the cache memory to the gateway upon determination that the requesting user device may receive the popular content from the gateway.

The gateway may be configured to be operative with respect of at least one of: multimedia broadcast multicast service (MBMS) and evolved MBMS (eMBMS).

The content may be provided from one or more multimedia content sources (MMCSs), each of the one or more MMCSs being communicatively coupled to the network.

The redirect of the request may occur prior to starting delivery of the popular content to the user device.

The redirect of the request may occur after a period of delivery of a portion of the popular content from the cache memory of the content caching system.

A size of the portion of the popular content may be determined to be such that upon switching from popular content delivery from the cache memory of the content caching system to the gateway, the user device continuously receives the popular content without interruption.

The processing unit may be further configured to: provide the popular content from the cache memory of the content caching system upon determination that the gateway is unable to provide the popular content to the user device.

The popular content may be multimedia content.

The content may be at least one of: live content and on-demand content.

The foregoing and/or other aspects of the exemplary embodiments may be achieved by a method for delivering popular content to a user device, the method including identifying content transferred over a network; determining a popularity of the identified content; storing, in a cache of a content caching system, content determined to be popular content; transferring the popular content to a gateway upon determination that the popular content may be delivered by the gateway, the gateway being communicatively coupled to the content caching system and configured to provide a multicast service respective of the popular content; receiving a request from the user device for delivery of the popular content; and redirecting the request to the gateway upon determination that the user device may be communicatively coupled to the gateway for reception of the popular content.

The foregoing and/or other aspects of the exemplary embodiments may be achieved with a non-transitory computer readable storage medium storing a program for executing a method for delivering popular content to a user device, the method including identifying content transferred over a network; determining a popularity of the identified content; storing, in a cache of a content caching system, content determined to be popular content; transferring the popular content to a gateway upon determination that the popular content may be delivered by the gateway, the gateway being communicatively coupled to the content caching system and configured to provide a multicast service respective of the popular content; receiving a request from the user device for delivery of the popular content; and redirecting the request to the gateway upon determination that the user device may be communicatively coupled to the gateway for reception of the popular content.

The foregoing and/or other aspects of the exemplary embodiments may be achieved by a content caching system including one or more processors; a cache configured to store popular content; and memory storing executable instructions that, when executed by the one or more processors, causes the one or more processors to: intercept a request from a user device to deliver the popular content stored in the cache; and redirect the request to deliver the popular content stored in the cache to a gateway based on a determination that the requesting user device may receive the popular content from the gateway, the gateway configured to provide a multicast service respective of the popular content.

BRIEF DESCRIPTION OF THE DRAWINGS

The foregoing and other objects, features, and advantages will become apparent and more readily appreciated from the following detailed description taken in conjunction with the accompanying drawings in which.

DETAILED DESCRIPTION OF EXEMPLARY EMBODIMENTS

Figure 1A:
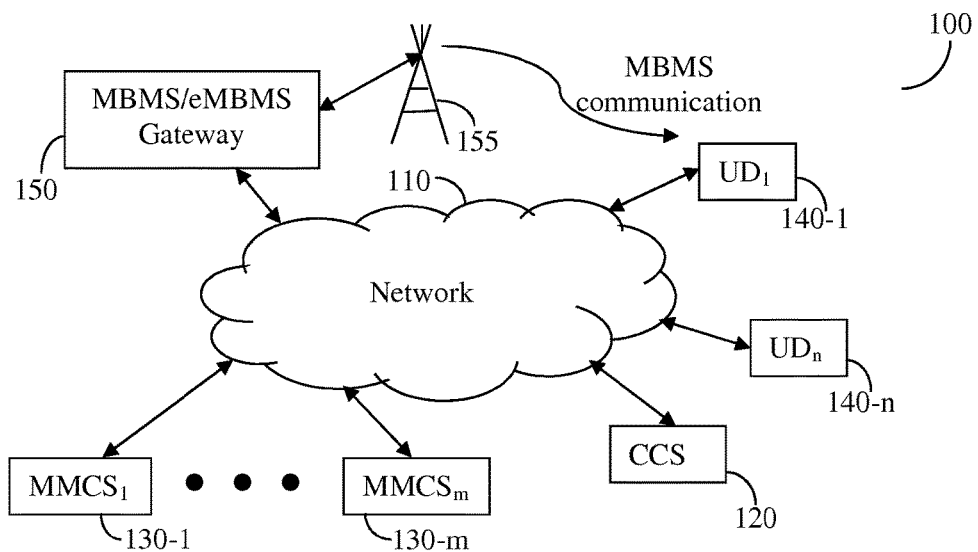
FIG. 1A is an MBMS/eMBMS off-load system operative according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

Multimedia content, live as well as on-demand, is typically delivered over a network responsive to a request by a user device from a content source and is provided point-to-point. Certain multimedia cache systems are designed to identify popular content, such as multimedia content, and provide such content from locations that are in proximity to the user device thereby reducing load on the overall network. The system and methods identify user devices capable of receiving content using an MBMS/eMBMS delivering popular content by redirecting the content delivery from content caches or the content source to an MBMS/eMBMS thereby reducing overall load of a network.

Reference is made now to FIG. 1A which is an exemplary and non-limiting MBMS/eMBMS off-load system 100 operative according to an exemplary embodiment. The system 100 comprises a network 110 that may comprise a local area network (LAN), wide area network (WAN), metro area network (MAN), the Internet, the worldwide web (WWW) and the like, including combinations thereof, which may be wired or wireless and combinations thereof. To the network 100 there are communicatively connected multimedia content sources (MMCSs) $S_1$ 130-1 through $S_m$ 130-m, where 'm' is an integer beginning with '1'. Each of the MMCSs 130 is capable of providing multimedia content, for example video clips, video streams, audio clips and audio streams, and the like, upon request from one or more user devices (UDs) 140-1 through 140-n, where 'n' is an integer beginning with '1', communicatively coupled to the network 110. That is, a UD, for example UD 140-1 may send a request for multimedia content from an MMCS, for example 130-1, and responsive thereof the MMCS 130-1 provides the desired content to the UD 140-1.

Figure 1B:
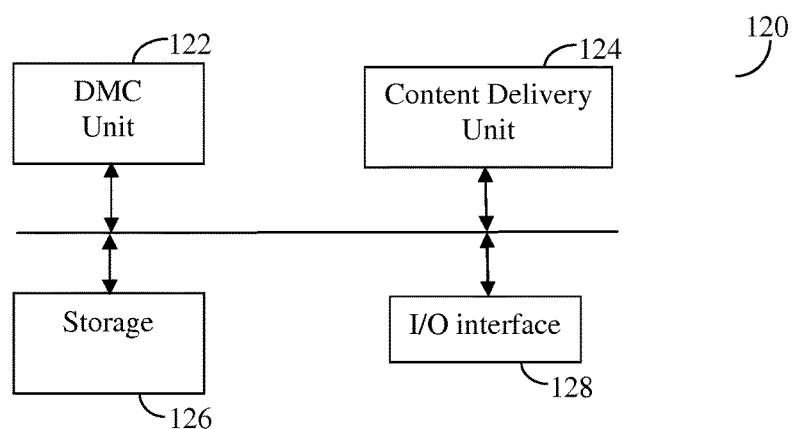
FIG. 1B is a content caching system (CCS) according to an exemplary embodiment.

To the network 110 there is further communicatively coupled a content caching system (CCS) 120. FIG. 1B describes an exemplary and non-limiting CCS 120 according to an exemplary embodiment. The CCS 120 comprises a deep media classifier (DMC) unit 122, a content delivery unit 124, a storage 126, which may be, for example, a cache memory, and an input/output (I/O) interface 128 for communicating via, for example, the network 110. Detailed description of an exemplary and non-limiting operation of a CCS 120 is provided in co-pending U.S. patent application Ser. No. 13/006,875 entitled "Methods for Detection of Content Servers and Caching Popular Content Therein" and Ser. No. 13/006,785 entitled "System for Detection of Content Servers and Caching Popular Content Therein", both assigned to common assignee, and which are hereby incorporated by reference in their entirety. While a single CCS 120 is described herein, one of ordinary skill in the art would readily appreciate that a plurality of such CCSs 120 may be connected to the network 110 without departing from the scope of the exemplary embodiments.

Returning to FIG. 1A, the CCS 120 identifies multimedia content transferred over the network 110 and is configured to determine popularity of certain content, and upon such determination store such content in a cache (e.g., storage 126) contained therein. In one embodiment the popularity may mean the actual use of the content by a number of UDs 140 that is above a predetermined threshold. In another embodiment popularity may mean an expectation of content to become popular based on the rate of increase in demand for the content by UDs 140. Other methods for determining popularity may be further used without departing from the scope of the exemplary embodiments. The CCS 120 is further configured such that upon identifying a request for popular content stored in the cache of CCS 120 it is capable of providing the content to the requesting UD, for example UD 140-2, when such a request is made to MMCS 130-1, for the same content previously provided to UD 140-1 and determined to be popular content.

The network 110 is further communicatively connected to a gateway 150 and one or more towers 155 that are configured to provide content via MBMS/eMBMS to the UDs 140 that are capable of receiving content using this service. Accordingly, a plurality of UDs 140 may receive the same content in a multicast or broadcast manner thereby relieving the network 110 from the point-to-point load associated with individual delivery to the requesting UDs 140. According to an exemplary embodiment the CCS 120 is further configured to provide to the MBMS/eMBMS gateway 150 popular content, based on the determination made by the CCS 120, (i.e., the gateway may be any one of a number of MBMS or eMBMS systems, and may be further referred to herein simply as gateway 150). In one exemplary embodiment, the delivery of the content to the gateway 150 is made via a broadcast/multicast service center (BMSC) (not shown). In such an embodiment the BMSC provides the likes of security services, session and transition services, service announcements, proxy and transport services as well as membership services.

It should be noted that providing the gateway 150 with content further involves a resource reservation of the gateway 150. Determination of which content to be provided may be further dependent on the type of requesting UDs 140, for example, a determination that a certain group of UDs 140 are capable of receiving MBMS transmissions. In one exemplary embodiment, the CCS 120 may redirect one or more of the UDs 140 to receive the content from the gateway 150 instead of from an MMCS 130.

Figure 2:
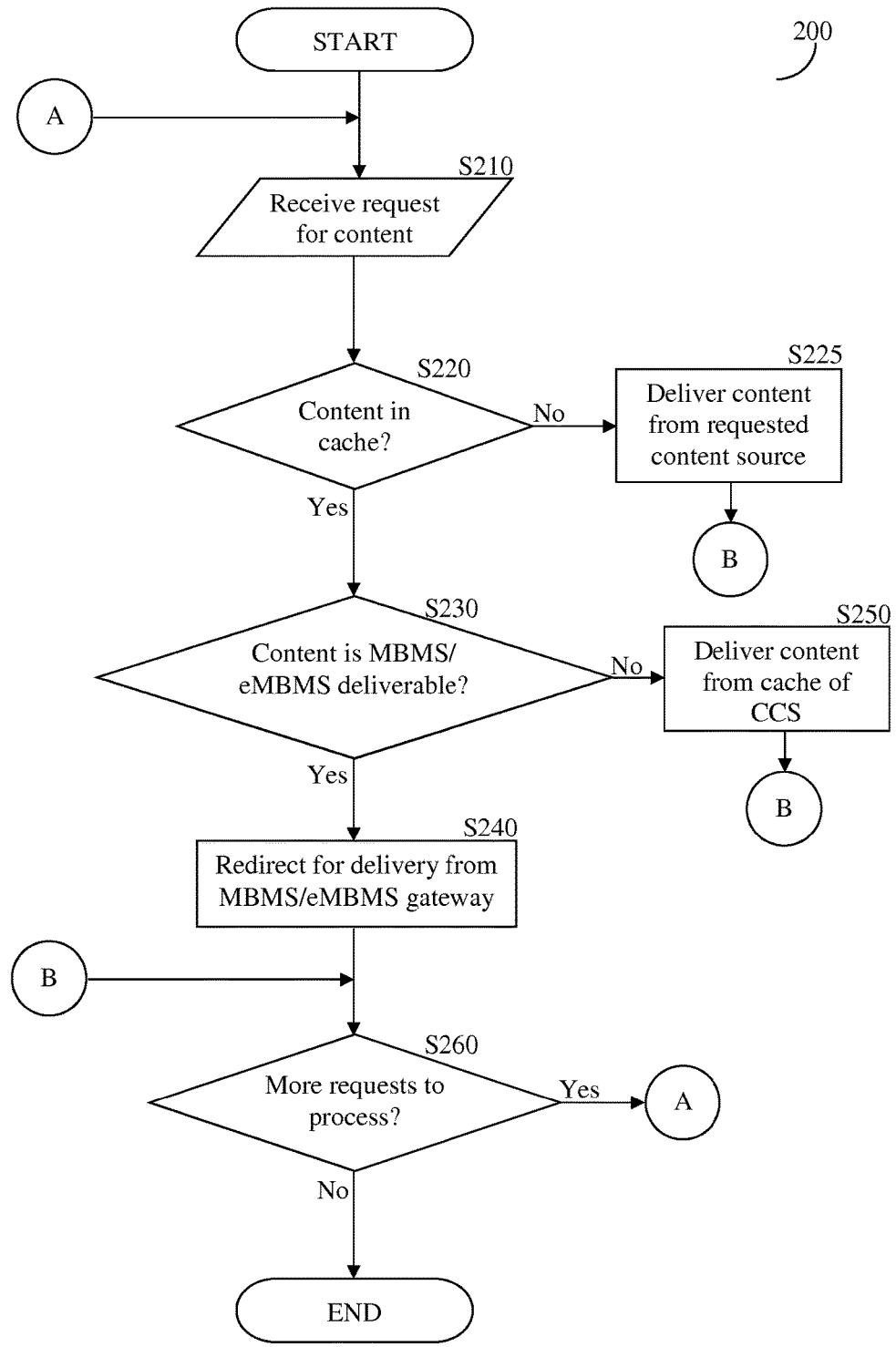
FIG. 2 is a flowchart describing the off-load operation of an MBMS/eMBMS off-load system operative according to an exemplary embodiment.

FIG. 2 is an exemplary and non-limiting flowchart 200 depicting the off-load operation of an MBMS off-load system 100 operative according to an exemplary embodiment. In S210 a request is received to get multimedia content from an MMCS 130. In S220 it is checked whether the content can be served from a cache and if so execution continues with S230; otherwise, execution continues with S225 where delivery is performed from an MMCS 130, after which execution continues with S260. In S230 it is checked whether the requested content can be delivered from the gateway 150 and if so execution continues with S240; otherwise execution continues with S250. In S240 the UD 140 is routed to request the data from the gateway 150 so that the UD 140 will receive the requested content using MBMS/eMBMS delivery; thereafter execution continues with S260. In S250 the UD 140 is routed to receive the requested content from the CCS 120; thereafter execution continues with S260. In S260 it is checked whether additional requests are to be processed and if so execution continues with S210; otherwise, execution terminates.

Figure 3:
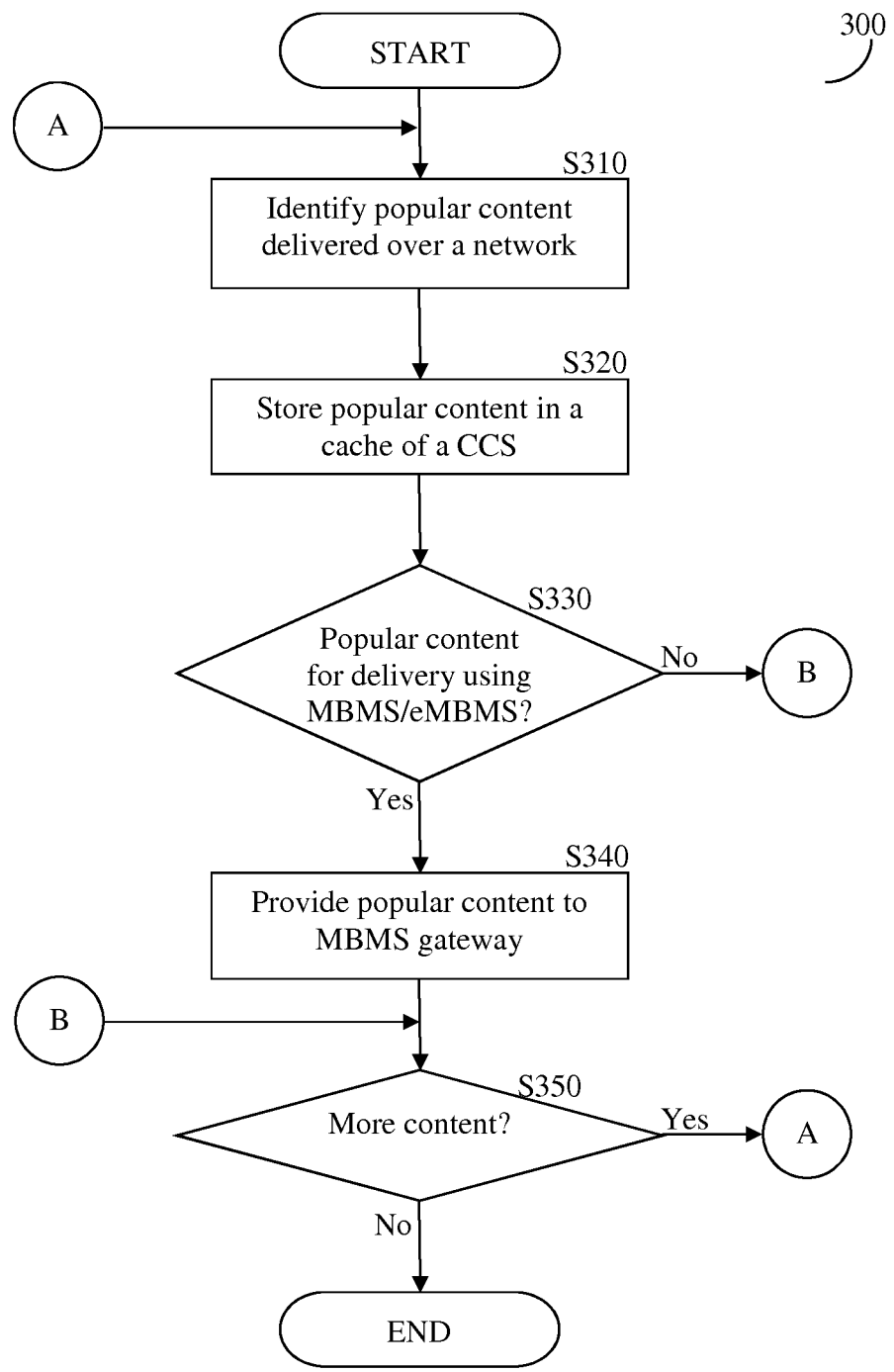
FIG. 3 is a flowchart describing the provisioning of a gateway with popular content according to an exemplary embodiment.

FIG. 3 is an exemplary and non-limiting flowchart 300 describing the provisioning of a gateway 150 with popular content according to an exemplary embodiment. In S310 existence of popular content is identified by CCS 120. In S320, responsive of determination that certain content is popular, the content is stored in the cache of the CCS 120. In S330 it is determined whether such popular content should be further delivered to a gateway 150 and if so, execution continues with s340; otherwise, execution continues with S350. In S340 the popular content is delivered to the gateway 150. In S350 it is checked whether the process should continue and if so, execution continues with S310; otherwise, execution terminates.

Figure 4:
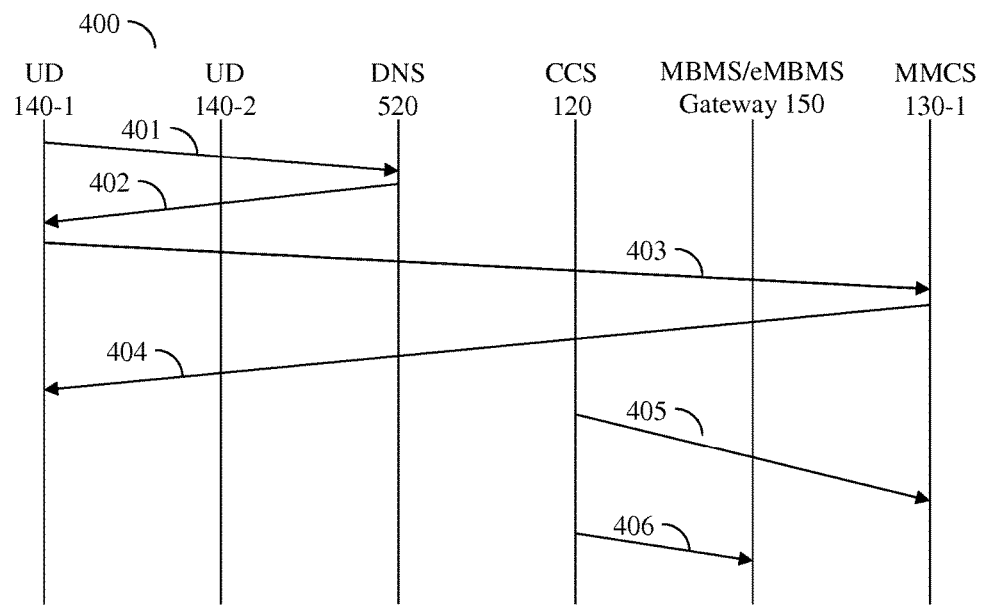
FIG. 4 is a network connectivity diagram of a cache fill according to an exemplary embodiment.

FIG. 4 is an exemplary and non-limiting network connectivity diagram 400 of a cache fill according to an exemplary embodiment. According to the diagram a UD 140, for example UD 140-1, requests to connect to a content source, for example foo.com and hence requests (401) a domain name server (DNS) 520 to provide the address for the domain. It should be noted that for simplicity a DNS is not shown in FIG. 1. The DNS 520 responds (402) with an internet protocol (IP) address, for example, 199.99.99.99. The UD 140 sends a GET content request (403) to an MMCS 130, for example MMCS 130-1, which responds with a 200 OK response (404) for the delivery of content. Content that is determined to be popular is acquired (405) by the CCS 120. The CCS 120 further enables content ingest (406) by the gateway 150, either in whole or selectively, for example by determination if such content should be also cached in the gateway 150. In other words, at operation 406, the CCS 120 determines that some or all of the acquired content should also be cached at the gateway 150 and consequently stores some or all of the content at the gateway 150.

Figure 5:
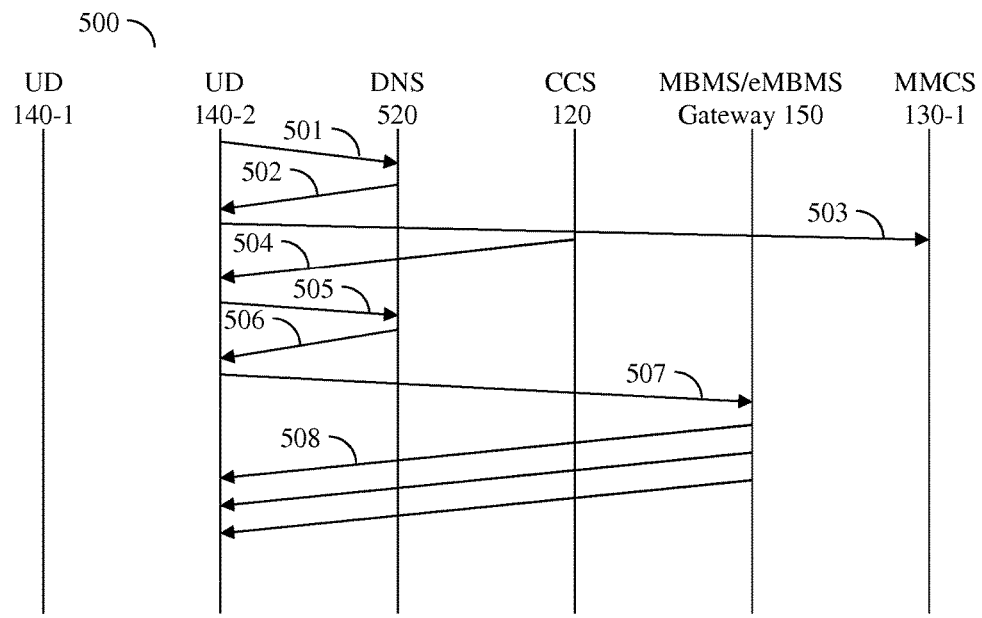
FIG. 5 is a network connectivity diagram of content serving by a gateway according to an embodiment.

FIG. 5 is an exemplary and non-limiting network connectivity diagram 500 of content serving by a gateway 150 according to an exemplary embodiment. In this case the connectivity diagram assumes that a requested content is stored in the cache of the gateway 150. Accordingly, a UD 140, for example UD 140-2, makes a request (501) to DNS 520 for an IP address for the domain foo.com. The DNS 520 responds (502) with the address 199.99.99.99. The UD 140-2 sends a GET content request (503) to the IP address 1999.99.99.99 which is intercepted by the CCS 120 which redirects (504) the request to the gateway 150. As a result, the UD 140-2 sends a request (505) to the DNS 520 for the IP address of the gateway 150, which may respond (506) with a DNS reply of an IP address 155.55.55.55. The UD 140-2 sends a GET content request (507) to the gateway 150, and since the gateway 150 already has the desired content stored in its cache, the gateway 150 sends (508) the data using multicast to UD 140-2.

While the description herein discussed delivery of popular content from either CCS 120 or gateway 150, embodiments where portions of the popular content are delivered partially from CCS 120 and gateway 150 are also possible. This is possible as the delivery of multimedia content in general, and video content in particular, is made such that a buffer of data is provided to the requesting UD 140. It is possible that certain UDs 140, for example UD 140-1, begin receiving data at a slightly different time than other UDs 140, for example UD 140-2.

In such a case, while UD 140-1 may be receiving data using the gateway 150 in a multicast, UD 140-2, joining at a different time, may need to be initially served from CCS 120 until such time that it has a buffer of data sufficient to switch for reception of subsequent data using the gateway 150, joining a multicast and thereby reducing the network bandwidth usage. Such a switch occurs in a manner that assures that the UD 140-2 continuously receives the popular content without interruption.

It is further possible for a user to switch from data reception from a gateway 150 multicast to a point-to-point service from CCMS 120. This can happen if the UD 140-2 requests to pause with the content delivery and then continue from the point of pause onwards. In such a case, data not in the cache of the UD 140-2 may not be available at the time of request from the gateway 150 and continued delivery would have to switch back to CCS 120.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the exemplary embodiments and the concepts contributed by the inventor to furthering the art, and are to be construed as being without limitation to such specifically recited examples and conditions. Moreover, all statements herein reciting principles, aspects, and exemplary embodiments of the present disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A content caching system comprising: an interface to a network, the network delivering content from one or more content sources to one or more user devices;
   a cache memory communicatively connected to the interface; and a processing unit, communicatively connected to the network, configured to:
   identify a popular content sent over the network; store at least part of the identified popular content in the cache memory;
   deliver at least some of the identified popular content from the cache to a gateway coupled to the network, the gateway configured to provide a multicast service for the popular content; intercept a request from a user device for delivery of the popular content stored in the cache memory; and
   redirect to the gateway the request for delivery of the popular content stored in the cache memory upon determination that the requesting user device may receive the popular content from the gateway;
   wherein the redirecting of the request occurs subsequent to the user device being able to join a wireless multicast of the requested content after a period of delivery of a portion of the popular content from the cache memory of the content caching system to the user device while the popular content is in the midst of being delivered to the user device so that delivery from the cache memory is terminated and delivery will continue such that at least a subsequent portion of the popular content will be delivered to the user device from the gateway as part of the wireless multicast,
   wherein a size of the portion of the popular content is determined to be such that upon switching delivery of the popular content from the cache memory of the content caching system to the gateway, the user device continuously receives the popular content without interruption.

2. The content caching system of claim 1, wherein the gateway is configured to multicast the popular content to at least the user device and at least one other user device using at least one of: a multimedia broadcast multicast service (MBMS) and an evolved MBMS (eMBMS).

3. The content caching system of claim 1, wherein the content is provided from one or more multimedia content sources (MMCSs), each of the one or more MMCSs being communicatively coupled to the network.

4. The content caching system of claim 1, wherein the redirecting of the request occurs without a further request.

5. The content caching system of claim 1, wherein the processing unit is further configured to: provide the popular content from the cache memory of the content caching system upon determination that the gateway is not permitted to provide the popular content to the user device.

6. The content caching system of claim 1, wherein the popular content is multimedia content.

7. The content caching system of claim 1, wherein the popular content is at least one of: live content and on-demand content.

8. The content caching system of claim 1, wherein the network is not configured as a peer-to-peer overlay network.

9. A method for delivering popular content to a user device, the method comprising:
   identifying a content transferred over a network;
   determining a popularity of the identified content;
   storing, in a cache of a content caching system, at least part of the identified content when it is determined to be popular content;
   transferring some of the popular content from the cache to a gateway upon determination that the popular content may be delivered by the gateway, the gateway being communicatively coupled to the content caching system and configured to provide a multicast service for the popular content;
   receiving a request from the user device for delivery of the popular content; and
   redirecting the request to the gateway upon determination that the user device may be communicatively coupled to the gateway for reception of the popular content;
   wherein the redirecting of the request occurs subsequent to the user device being able to join a wireless multicast of the requested content after a period of delivery of a portion of the popular content from the cache of the content caching system to the user device while the popular content is in the midst of being delivered to the user device so that delivery from the cache is terminated and delivery will continue such that at least a subsequent portion of the popular content will be delivered to the user device from the gateway as part of the wireless multicast,
   wherein a size of the portion of the popular content is determined to be such that upon switching delivery of the popular content from the cache of the content caching system to the gateway, the user device continuously receives the popular content without interruption.

10. The method of claim 9, wherein the gateway is configured to multicast the popular content to at least the user device and at least one other user device using at least one of: a multimedia broadcast multicast service (MBMS) and an evolved MBMS (eMBMS).

11. The method of claim 9, wherein the content is provided from one or more multimedia content sources (MMCSs), each of the one or more MMCSs being communicatively coupled to the network.

12. The method of claim 9, wherein the redirecting of the request occurs without a further request.

13. The method of claim 9, further comprising: providing the popular content from the cache of the content caching system upon determination that the gateway is not permitted to provide the popular content to the user device.

14. The method of claim 9, wherein the popular content is multimedia content.

15. The method of claim 9, wherein the content is at least one of: live content and on-demand content.

16. The method of claim 9, wherein the network is not configured as a peer-to-peer overlay network.

17. A non-transitory computer readable storage medium storing a program for executing a method for delivering popular content to a user device, the method comprising:
identifying content transferred over a network, the network not being configured as a peer-to-peer overlay network;
determining a popularity of the identified content;
storing, in a cache of a content caching system, at least part of the identified content when it is determined to be popular content;
transferring at least some of the popular content from the cache to a gateway upon determination that the popular content may be delivered by the gateway, the gateway being communicatively coupled to the content caching system and configured to provide a multicast service for the popular content;
receiving a request from the user device for delivery of the popular content; and
redirecting the request to the gateway upon determination that the user device may be communicatively coupled to the gateway for reception of the popular content;
wherein the redirecting of the request occurs subsequent to the user device being able to join a wireless multicast of the requested content after a period of delivery of a portion of the popular content from the cache of the content caching system to the user device while the popular content is in the midst of being delivered to the user device so that delivery from the cache is terminated and delivery will continue such that at least a subsequent portion of the popular content will be delivered to the user device from the gateway as part of the wireless multicast;
wherein a size of the portion of the popular content is determined to be such that upon switching delivery of the popular content from the cache memory of the content caching system to the gateway, the user device continuously receives the popular content without interruption.

18. A content caching system comprising:
one or more processors;
a cache configured to store popular content; and
a memory storing executable instructions that, when executed by the one or more processors, causes the one or more processors to:
intercept a request from a user device for delivery of an item of popular content stored in the cache; and
redirect the request for delivery of the item of popular content stored in the cache to a gateway based on a determination that the requesting user device may receive the item of popular content from the gateway, the gateway configured to provide a multicast service for the item of popular content;
wherein the redirecting of the request occurs subsequent to the user device being able to join a wireless multicast of the requested content after a period of delivery of a portion of the popular content from the cache of the content caching system to the user device while the popular content is in the midst of being delivered to the user device so that delivery from the cache is terminated and delivery will continue such that at least a subsequent portion of the popular content will be delivered to the user device from the gateway as part of the wireless multicast;
wherein a size of the portion of the popular content is determined to be such that upon switching delivery of the popular content from the cache memory of the content caching system to the gateway, the user device continuously receives the popular content without interruption.

* * * * *